Figure 1:
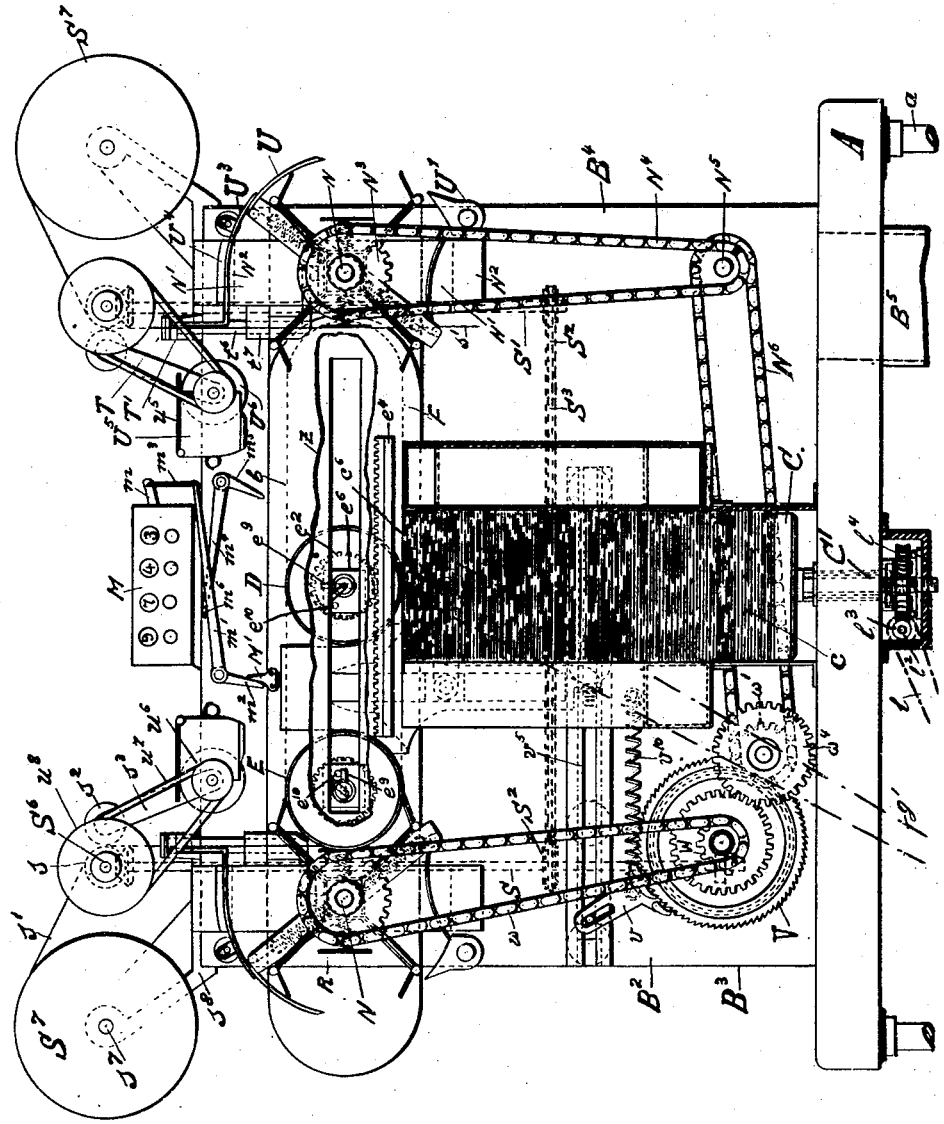

A. VON BARTH.
COUNTING MACHINE.
APPLICATION FILED AUG. 12, 1909.

1,068,036.

Patented July 22, 1913.
8 SHEETS—SHEET 1.

Witnesses:
Elizabeth B. King
[signature]

Arthur von Barth
Inventor

By his Attorney
Donald Campbell

A. VON BARTH.
COUNTING MACHINE.
APPLICATION FILED AUG. 12, 1909.
1,068,036.
Patented July 22, 1913.
8 SHEETS—SHEET 2.
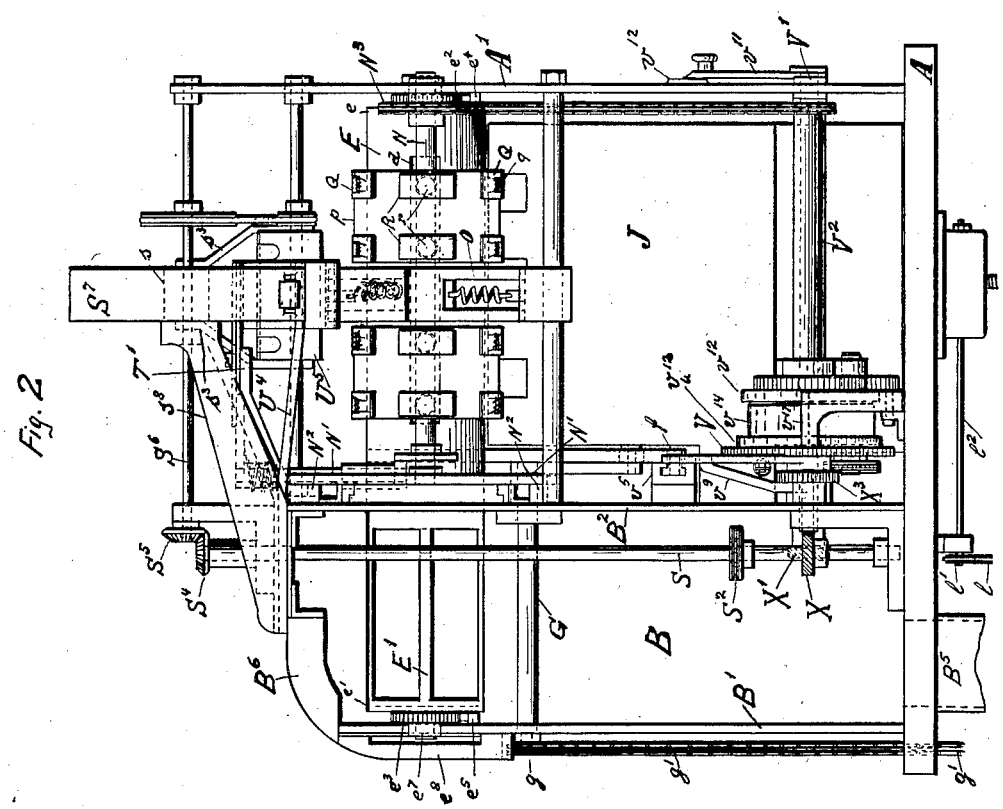

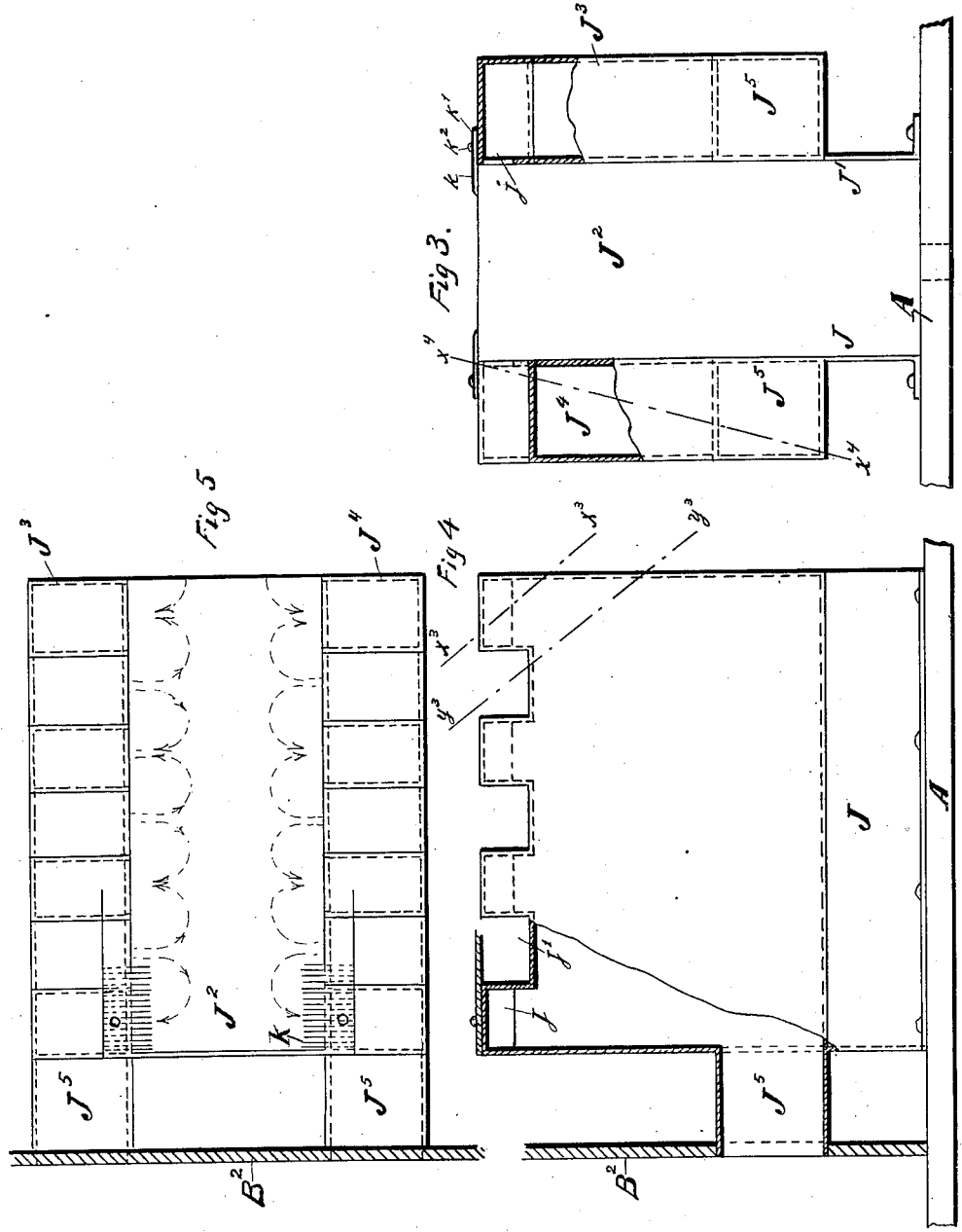

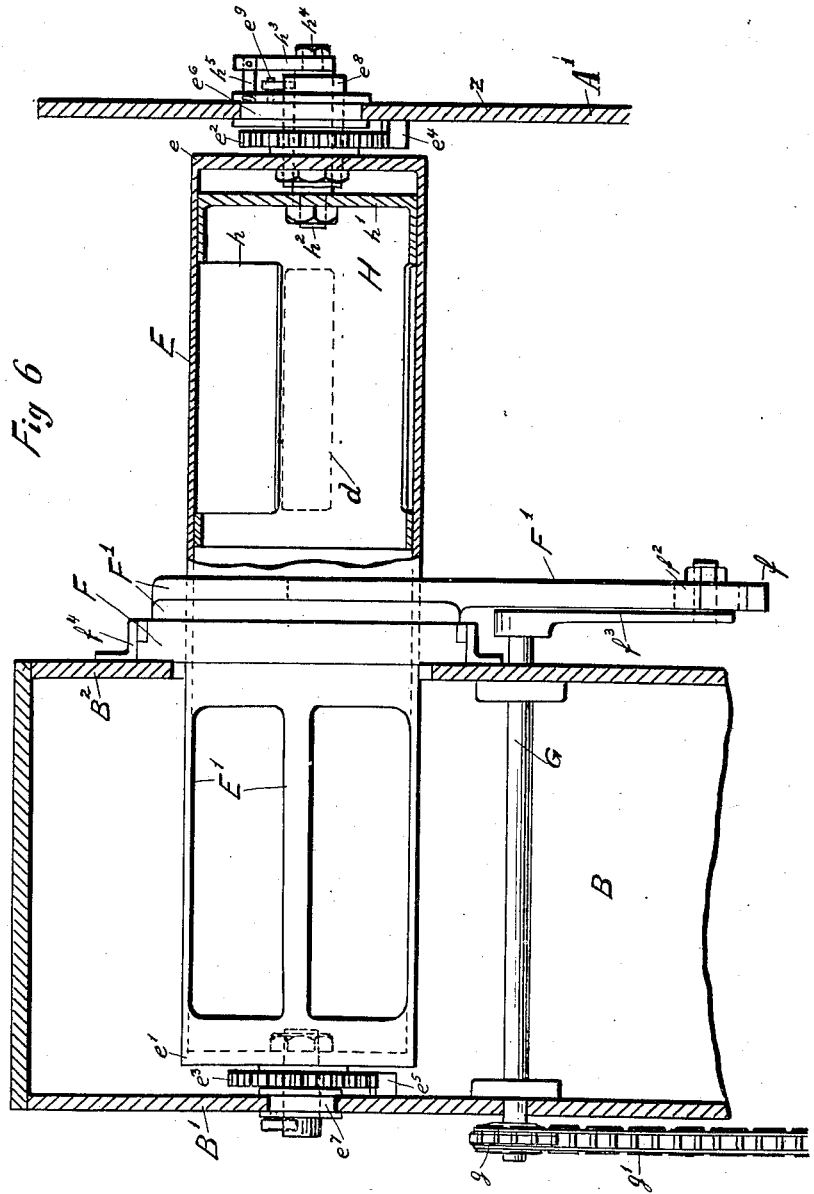

A. VON BARTH.
COUNTING MACHINE.
APPLICATION FILED AUG. 12, 1909.
1,068,036.
Patented July 22, 1913.
8 SHEETS—SHEET 5.
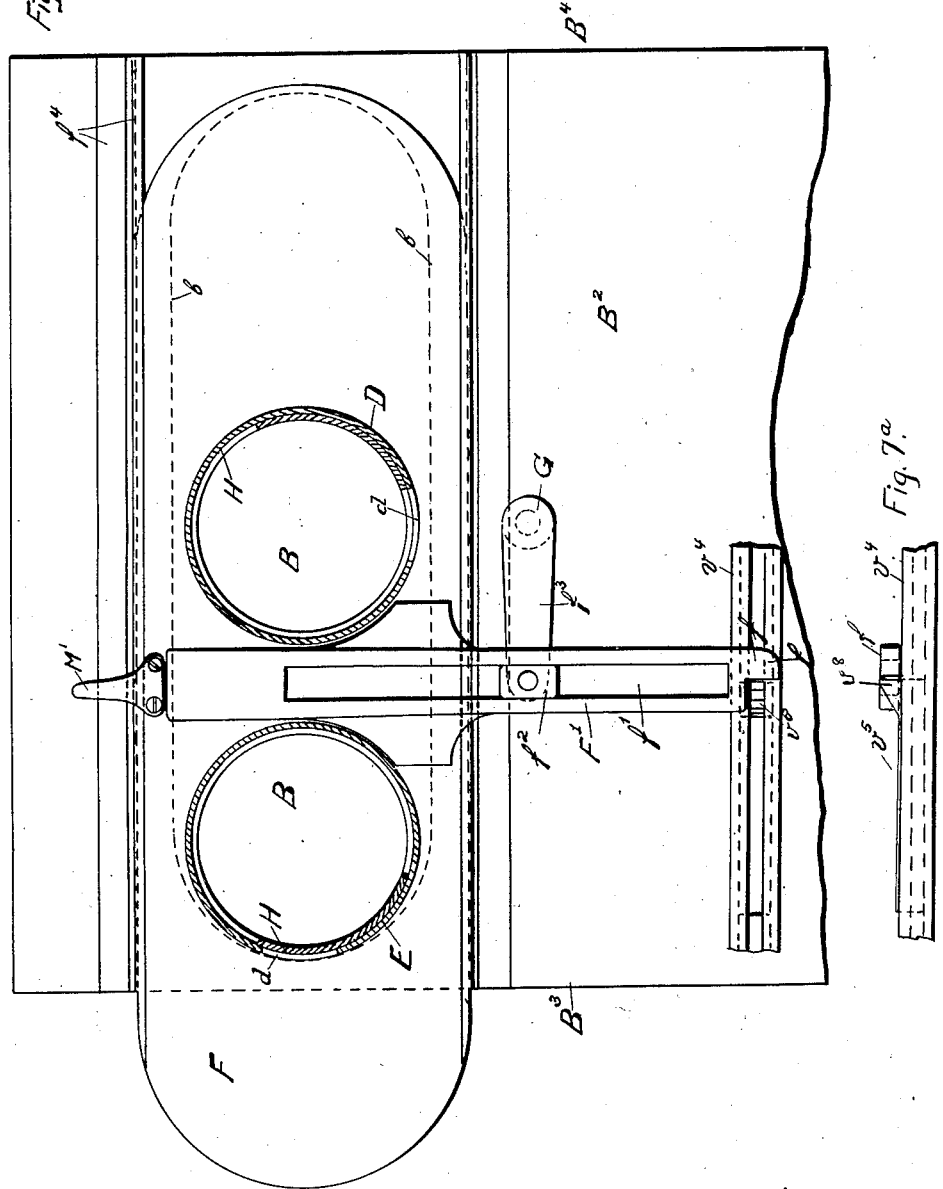

A. VON BARTH.
COUNTING MACHINE.
APPLICATION FILED AUG. 12, 1909.
1,068,036.
Patented July 22, 1913.
8 SHEETS—SHEET 6.
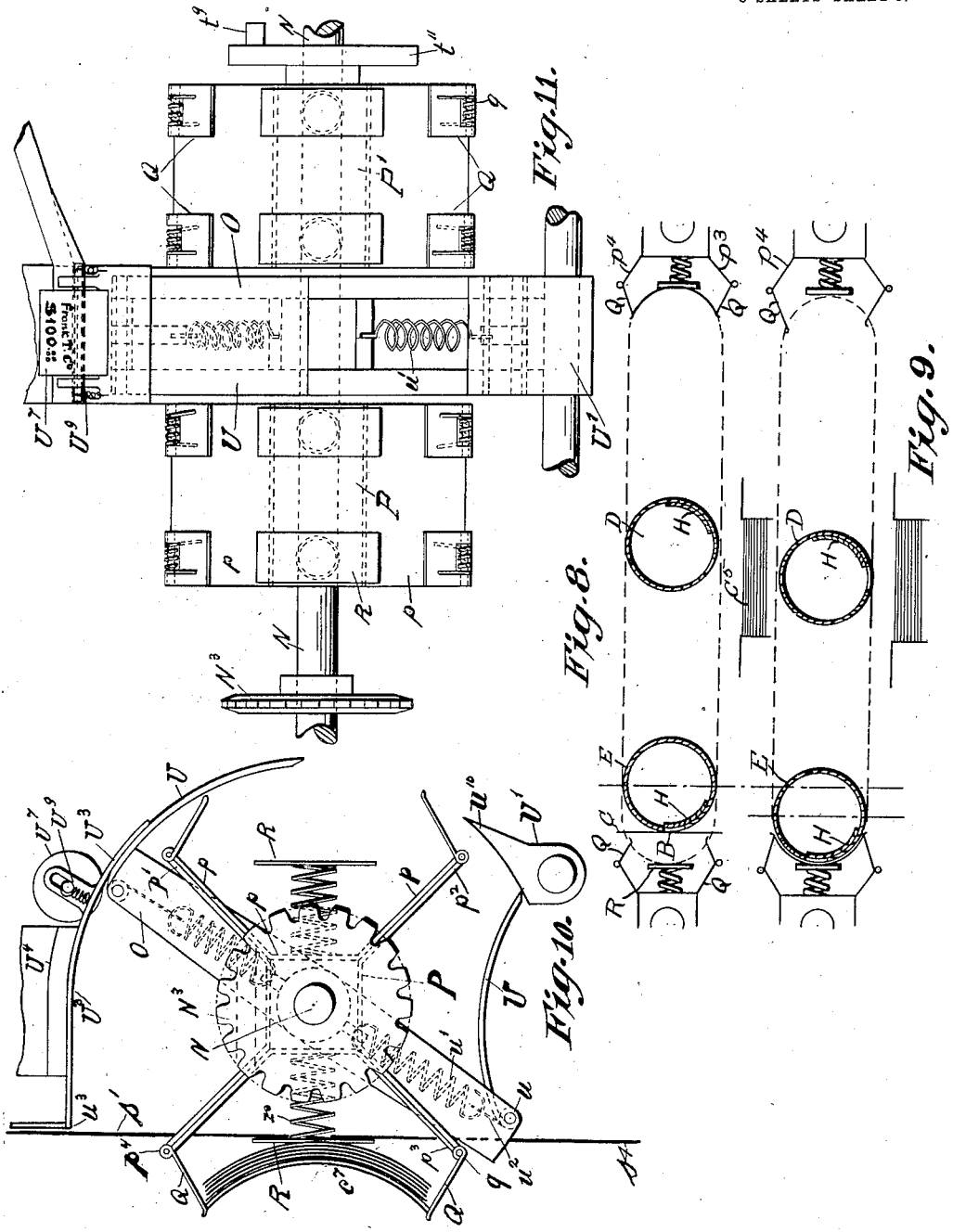

A. VON BARTH.
COUNTING MACHINE.
APPLICATION FILED AUG. 12, 1909.
1,068,036.
Patented July 22, 1913.
8 SHEETS—SHEET 7.
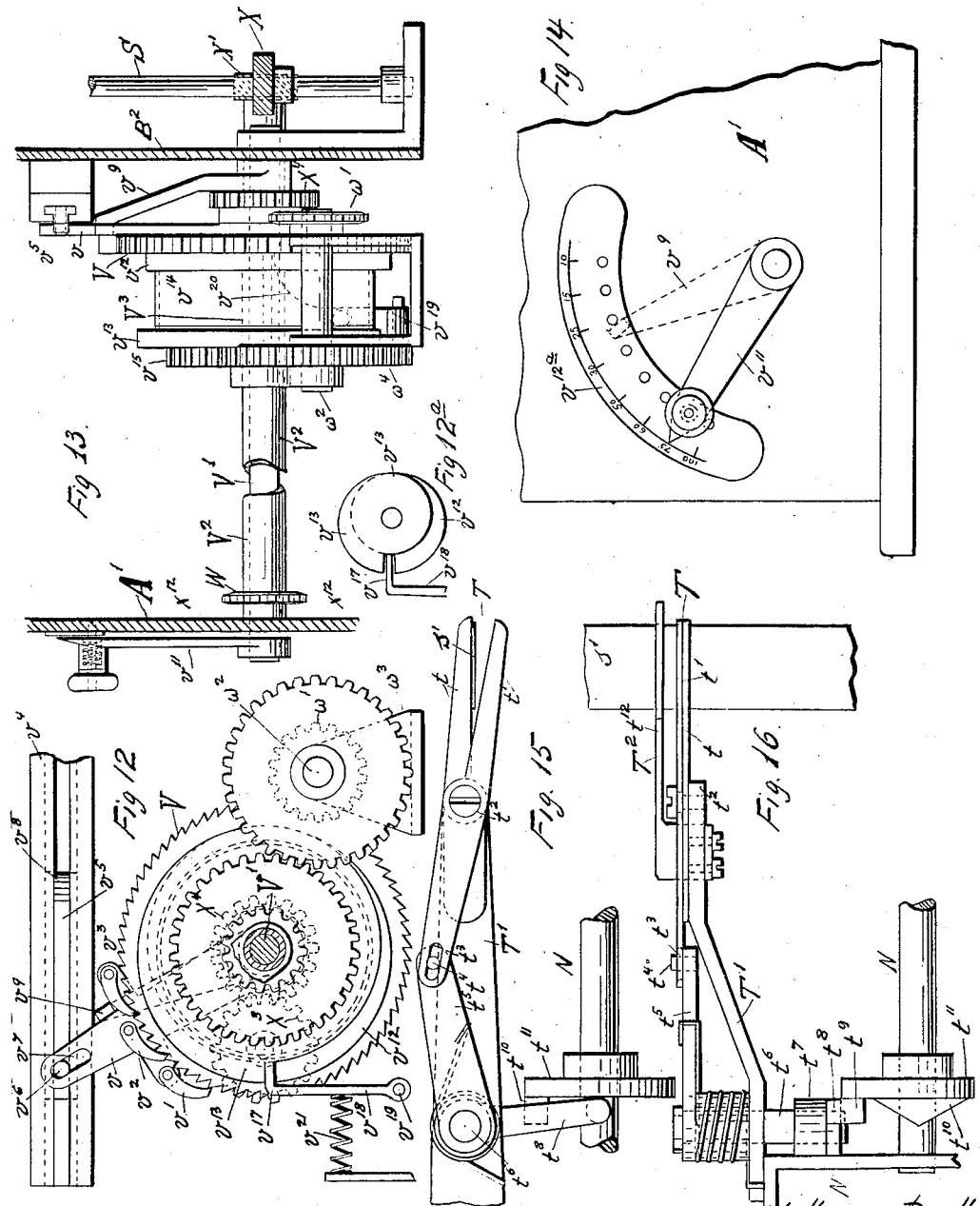

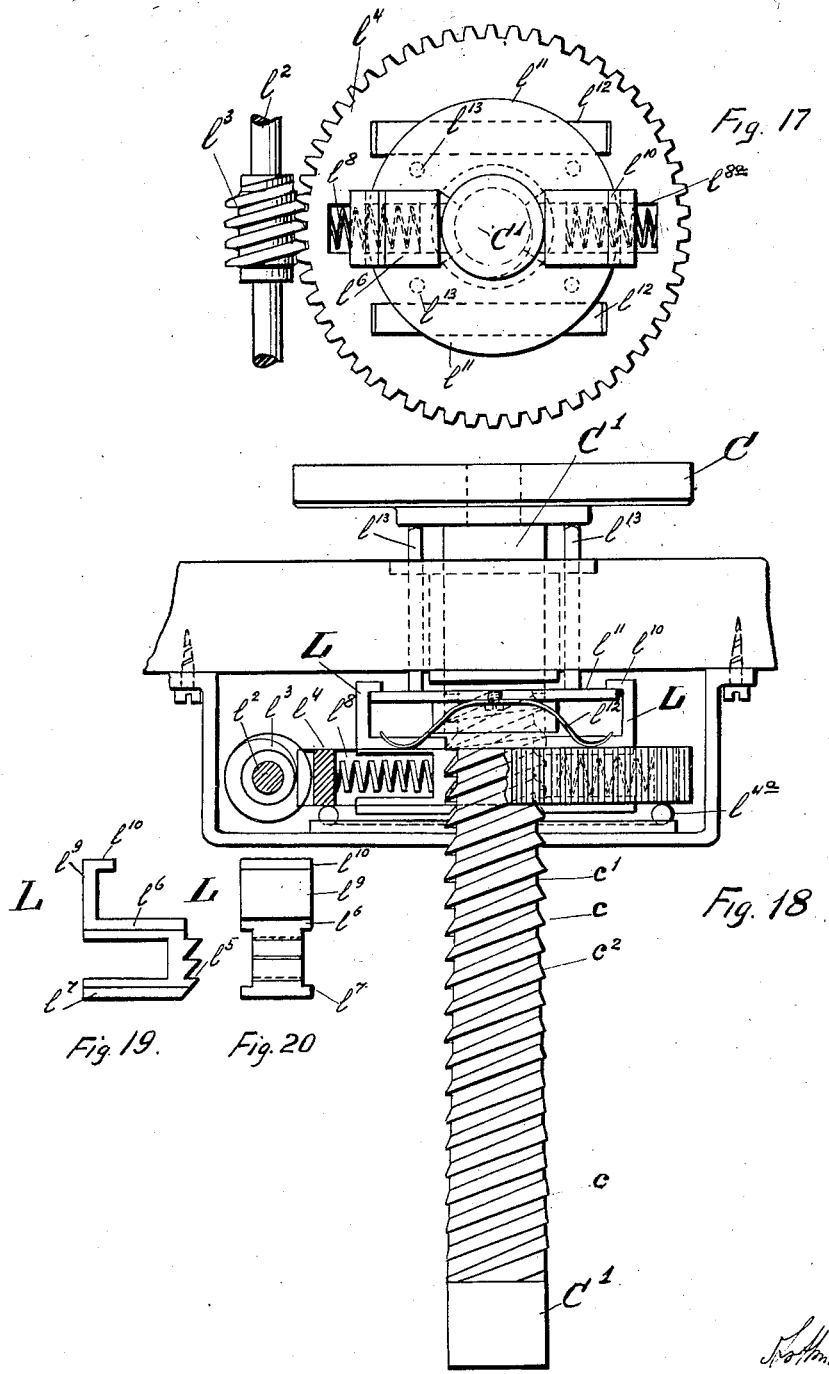

UNITED STATES PATENT OFFICE.

ARTHUR von BARTH, OF NEW YORK, N. Y.

COUNTING-MACHINE.

1,068,036.  Specification of Letters Patent.  Patented July 22, 1913.

Application filed August 12, 1909. Serial No. 512,606.

*To all whom it may concern:*

Be it known that I, ARTHUR VON BARTH, a citizen of the United States, residing in the city, county, and State of New York, have invented certain new and useful Improvements in Counting-Machines, of which the following is a specification.

My invention relates to counting machines and more particularly to machines for counting paper money such as currency bills, although it may be equally useful for other kinds of bills or for other paper or similar articles which need to be counted.

The invention also relates to several different portions of such machine and improvements therein, namely, that portion of the mechanism which successively takes the bills from a column and transfers them to the receptacle or place where the counted bills are received or bunched; also to devices or mechanism for receiving the successive bills as they are transferred and for bunching and binding them and stamping the successive bunches with any desired marking; also to feeding mechanism for the table which supports the uncounted objects; and also to improvements in the regulating devices for determining the number of objects to be comprised in each bunch.

I will first describe one form of machine in which my invention may be embodied, and will then set forth the novel features thereof in the claims.

In the accompanying nine sheets of drawings which form a part of this specification, Figure 1 is a front view of one form of machine embodying my improvements, this being a double machine. The figure indicates the front plate or face plate as broken away in order to better disclose the interior mechanism, the broken away portion being that outside of the broken line $z$. Fig. 2 is a left-hand end view of the machine shown in Fig. 1, but with the end plate $B^3$ of Fig. 1 entirely removed in order to disclose the interior of the main suction chamber. These two figures do not show the driving motor, but show the chain $g'$ which would extend to a motor but is broken off at the edge of the drawings. Fig. 3 is a front view, Fig. 4 is a side view partly in section, and Fig. 5 is a top view, of the compartment or box which holds the uncounted bills, together with the auxiliary suction chambers on each side thereof. Fig. 3 is partly in section, taken on the inclined planes represented by the lines $x^3$—$x^3$ and $y^3$—$y^3$ of Fig. 4. Fig. 4 is partly in section taken on inclined plane $x^4$—$x^4$ of Fig. 3. Fig. 6 is a vertical central section through the bill-transferring cylinder D, but with the latter removed from the position of Fig. 1 to its extreme right-hand position, and the figure includes the cut-off valve, together with a portion of the suction chamber B and the face plate A'. Fig. 7 is a front view of a detail, namely, the slide which slides with the cylinders and which maintains the main suction chamber closed; the cylinders and their valves being shown in section. Fig. 7$^a$ is a detail side view of certain of the parts seen in Fig. 7. Figs. 8 and 9 are diagrams illustrating the operation of the cylinders and the mode of passing counted bills into the bill-gripping mechanism. Fig. 10 is a front view of the bill-gripping, bunching, wrapping and stamping mechanism at the right-hand end. Fig. 11 is a vertical elevation of the same looking from the right-hand end. Fig. 12 is a front view in detail of the portion of the mechanism which registers the number of bills to be comprised in each package and controls the bunching, wrapping and stamping mechanism. Fig. 12$^a$ represents a detail view in order to show more clearly the parts $v^{12}$ $v^{13}$ of Fig. 12. Fig. 13 shows the same parts but looking from the right-hand end. Fig. 14 is a view of the same looking from the left-hand end of Fig. 13, showing the scale and pointer by which the operation of the registering mechanism is adjusted, this being located on the front of the face plate A'. Fig. 15 is an enlarged detail in top view showing the construction and arrangement of the scissors which clips off the paper strip to form bands for binding the bills; and Fig. 16 is a side view of the same looking from the lower side of Fig. 15. Figs. 17 to 20 relate to the automatic mechanism which raises the table carrying the column of uncounted bills, Fig. 17 being a top view of the parts beneath the table, Fig. 18 an elevation partly in section, and Figs. 19 and 20 illustrating the jaws.

Similar letters of reference designate corresponding parts in the several figures.

A represents a horizontal table which has table legs $a$ that may extend to the floor giving support to the entire apparatus. The motor for driving the apparatus may be located on a shelf supported by said legs beneath the table, but is not shown as its details form no part of this invention. The suction for the suction chamber may be produced by said motor or by any other convenient means not shown.

Most of the mechanism hereinafter to be described is located above the table A. In the first place there is a framework of stationary plates and parts which form supports for the moving portions of the mechanism. Of said framework it is sufficient to refer to the front or face plate A', best seen in Fig. 2, but also seen partially within the broken line z, Fig. 1. Practically all of the mechanism hereinafter to be described is behind said front plate A'.

At the rear and above the table A is a main suction chamber whose walls also constitute stationary portions which give support to the moving parts of the mechanism. The space within the main suction chamber is indicated by the letter B, Figs. 2, 6 and 7. Said main suction chamber has a vertical rear wall B', Figs. 2 and 6, a front wall B², Figs. 1, 2, 6 and 7, and left and right-hand end walls B³ and B⁴, Figs. 1 and 7. Air is drawn out of the main suction chamber through an opening in the table A and the pipe B⁵ extending below the table to any convenient source of suction. The top of the main suction chamber is closed as shown at B⁶ in Fig. 2, in which figure the left-hand end plate B³ has, as stated, been removed to more clearly show the interior. This suction chamber, it will be seen from the above description, is in the form of a square box set on top of the table A at the rear thereof. In front of the suction chamber are certain mechanisms which will be described, they being located between said chamber and the front wall A'. Among these is included a suction device in the form of a cylinder for successively engaging a series of bills or other objects to be counted and transferring them to where the counted objects are gathered. I will first, however, describe the manner in which the uncounted bills are sustained in position to coöperate with the transferring mechanism.

The bills are supported upon a feed table C, Figs. 1 and 18. The bills themselves are clearly seen in Fig. 1 at c, they being laid horizontally one upon another in a uniform column extending from the table C up to the top, from which point the bills are successively removed, as will hereinafter be explained. The bills are laid with their long side extending from front to rear so that the ends of the bills are seen in Fig. 1. Extending downwardly from the feed table C is a thread shank C' which supports the feed table and, as will hereinafter appear, serves to gradually lift the same as the operation of the machine progresses, so that the removal of bills at the top of the column is compensated for by the gradual elevation of the feed table. Before describing the mechanism for operating the feed table, we will pass to the mechanism for transferring the bills successively from the top of the column to the place where the counted bills are received, bunched, bound and stamped.

The means for taking the successive bills from the top of the column c and removing them, consists of a suction device whose nature will be more specifically explained, which suction device is so mounted as to be capable of shifting to and fro preferably in horizontal direction, this shifting movement bringing it from a position above the column of bills to a position removed therefrom; and each to and fro movement is intended to cause the removal and transference of the topmost bill. As shown the suction device herein takes the form of a cylinder which is capable not only of bodily shifting from its position above the bills to a position to one side, but is also capable of rotating simultaneously with the shifting movement or with a portion of the shifting movement.

D represents one of the suction cylinders just referred to. I have shown the second of such cylinders E, and the employment of two rather than one is of considerable importance and economy in the operation of my machine for the reason that while one cylinder is shifting from the column of bills and back, the other cylinder is made to shift toward the column of bills and away, thus doubling the capacity of the machine.

The cylinders D, E, are best seen in Figs. 1, 2, 6 and 7. It will be understood that each cylinder is constantly in connection with the interior of the main suction chamber B so that a suction is maintained at all times within the cylinders. As the cylinders must also slide or shift to and fro, a special contrivance is necessitated and this is shown in Figs. 6 and 7 in the form of a slide F which slides or shifts horizontally to and fro with the suction cylinders. The main suction chamber is cut away as indicated by the dotted line b, Figs. 1 and 7, on its front side, this opening being of such shape as to permit the two cylinders D and E to have continual connection with the interior of the suction chamber, and the slide F being of such shape and arrangement as to continually close said opening except at the points where the suction cylinders connect. Any convenient form of guides for the slide bar F may be employed, such for example as that shown at f⁴, Fig. 6, and these guides will prevent the leakage of air. It should be stated, however, that there is no great tendency for leakage since on account of the interior suction, there is an outward atmospheric pressure holding the slide F against the wall of the main suction chamber.

The suction cylinders are best seen in Fig.

6. The cylinder E, for example, extends from its front end $e$ which is near the front plate A' of the machine, to its rear end $e'$ which is within the main suction chamber and in proximity to the rear wall thereof. In Fig. 7 is shown the manner in which the cylinders D, E, are passed through the slide F, although in this figure for convenience the distance between the two cylinders is made very much less than in the other figures of the drawings.

In order to guide the cylinders and maintain them in position while the slide F is moved to and fro, the said cylinders are provided with pinions at their ends. For example the cylinder E, Fig. 6, has a pinion $e^2$ at its forward end and a pinion $e^3$ at its rear end, these pinions engaging upon fixed racks $e^4$ and $e^5$ respectively, secured to the front plate A' of the machine and the rear wall B' of the main suction chamber. The result of this construction is that not only are the cylinders properly guided and maintained in horizontal and parallel position while being shifted to and fro, but they are also caused to rotate by reason of the action between the pinions and racks.

The portion of each cylinder which is within the main suction chamber is of skeleton construction as seen at E', Figs. 2 and 6, so as to permit a free flow of air. The portion of the cylinder which is outside of or in front of the main suction chamber is of a peculiar construction which will be explained more fully hereinafter.

It should be here stated that in the rear wall B' of the main suction chamber and also in the face plate A' of the machine, horizontal slots are formed slightly higher than the racks $e^4$, $e^5$, and in each of these slots a pair of slides plays to and fro. The front slides are designated by $e^6$, and the rear slides by $e^7$, and each slide, as best seen in Fig. 1, and 6, contains a bearing for the axle of one of the suction cylinders, thus permitting the ends of said axles not only to move to and fro, but also to rotate. In order to prevent leakage of air where the slides $e^7$ operate in the rear wall B' of the main suction chamber, I have provided an exterior box $e^8$, Fig. 2, which incloses said slides and the slot in which they work so as to prevent entrance of air.

I will now describe the means whereby the to and fro movements of the slide F and the cylinders D, E, are obtained. Rigid with or fastened to the slide F is an extension F' which is preferably located in a central position and extends downwardly to where at its lower end it is provided with a toe $f$, whose purpose will be made to appear hereinafter. The extension F' is vertically slotted at $f'$ and in said slot there works upwardly and downwardly a slide block $f^2$. This slide block is intended to be actuated by a rotating crank $f^3$ which is pivoted to the block and which at its other end is secured to a shaft G driven by a motor. On the rotation of the shaft G the same acting through the extension F', causes said extension and the slide F to move horizontally to and fro to an extent equal to twice the length of crank $f^3$. The shaft G may be characterized as the main shaft of the machine, since most of the other motions are obtained directly or indirectly from it. Said shaft G is mounted in convenient bearings, which for convenience are made to pass through the walls of the main suction chamber, as seen in Fig. 6, and at the rear where emerging, a sprocket wheel $g$ is shown engaged by the sprocket chain $g'$ which extends downwardly to the driving motor already referred to. The sprocket chain $g'$ is also seen in Fig. 1. The motor, however, is for simplicity omitted.

I will now describe the construction of the forward end of one of the suction cylinders and the mode of operation by which it serves to remove the topmost of the uncounted bills and transfer it to where the bills are received, bound and stamped.

Fig. 1 shows the suction cylinder D as located directly above the topmost uncounted bill. In said position the cylinder has a lengthwise slot at its lower side through which slot the suction may act to cause the topmost bill to adhere pneumatically to the cylinder and permit its bodily removal from the column of uncounted bills. In Fig. 7 the cylinder D is shown in this same position and the slot referred to is indicated at $d$ at the lower side of the cylinder. As already pointed out the cylinder D when it is shifted to the right away from the column of bills is also rotated and a consideration of the arrangement of rack and pinion in Fig. 1 will indicate that this rotation is right-handed or in the direction of the hands of a watch. The actual motion of the cylinder is a sort of rolling motion and the lower portion thereof containing the slot $d$ with the topmost bill adhering thereto, moves first vertically, then curving to the right until the cylinder has made substantially three-fourths of a turn, after which the bill is intended to be released and taken in charge by the bunching, binding and stamping mechanisms. In order to effect the opening and closing of the slot $d$ at the proper times, I have provided an interior cylindrical device whose operation may be compared to that of a valve. This valve is indicated by the letters H, Figs. 6 and 7, and is seen to be in its general shape that of a cylinder closely concentric within the suction cylinders D, E. A large portion of the valve H is cut away so as to leave the slot $d$ open during substantially three-fourths of a revolution of the suction cylinder, and the valve device is held stationary while the suction cylinder revolves. The cut away portion is clearly seen in Fig. 7, it being that portion which is not sectioned, and it is also seen at $h$, Fig. 6. The means for holding the valve device H stationary is as follows. Bolted to its forward end wall $h'$ is an axle or pin $h^2$ which passes completely through the axle or sleeve $e^8$ that is attached to and turns with the suction cylinder. At its outward or forward end the pin $h^2$ is provided with a laterally extending arm $h^3$, said arm being rigidly secured to the pin $h^2$ by having a nut $h^4$ at the end of pin $h^2$, said nut binding the arm against a shoulder formed on the pin for that purpose. The outward extremity of the arm $h^3$ is held against rotation by a small screw $h^5$ which is passed through said arm and screwed into the middle of the slide $e^6$. This contrivance prevents any rotation of the valve device H so that as the suction cylinders shift to and fro said cylinders will rotate, but the valve device will simply move horizontally without rotation. Inspection now of Fig. 7 will disclose that the slot $d$ must be open after it has picked up the topmost bill and until it has rotated in a right-handed direction for substantially three-fourths of the circumference of the cylinder. At this point the wall of the valve device comes into operation closing the slot $d$ and shutting off the suction, thus permitting the bill to be released and disposed of as will hereinafter appear. The left-hand cylinder E in Fig. 7 is shown as rotated until its slot $d$ has been closed as described.

It will be seen in Fig. 1 that the rack $e^4$ is cut off at the right-hand end at a point which causes the disengagement of the pinion $e^2$ and the rack before reaching the end of the outward stroke. It is calculated that at three-fourths of a revolution the pinion and rack become disengaged. The remainder of the outward movement of the pinion $e^2$ and the slide $e^6$ and cylinder is accomplished without further revolution. This action is very desirable in connection with the form of bunching, binding and stamping mechanism employed herein. In order to prevent the pinion and cylinder from continuing their rotation by force of inertia, I have provided a pair of stop pins, namely a stop pin $e^9$ which is fast to and rotates with the axle or sleeve $e^8$, and the pin $e^{10}$ which does not rotate but is secured upon the slide $e^6$ in the position shown. After three-fourths of a revolution the pin $e^9$ strikes the pin $e^{10}$ and insures that the remainder of the outward movement is without further revolution. In Fig. 1 the left-hand suction cylinder E is shown in outward position with the pin $e^9$ in contact with pin $e^{10}$.

Figs. 8 and 9 diagrammatically show the operation just explained. In Fig. 8 the cylinder E is shown as having moved outwardly or to the left for three-fourths of a revolution, and at this point the valve H has just accomplished the closing of the slot $d$ so that the bill $c$ is released while in vertical position. Fig. 9 shows the extreme outward position, the cylinder E having moved continually from the position of Fig. 8 to that of Fig. 9 in a horizontal direction without rotation and in such manner as to push the released bill $c$ directly into the flexible jaws of the receiving device. This arrangement insures that the bill is always shoved straight into position horizontally, also that whenever a stiff bill is encountered which tends to flatten out as seen in Fig. 8, it will not be brought into the proximity of the receiving jaws while being rotated, and in this way the device precludes the possibility of the bill striking one of the jaws during rotation and thus displacing it before entering the space between the jaws.

I will now describe the details of the box or compartment which holds the column of uncounted bills. This is shown in Figs. 3, 4 and 5, with the feed table omitted. Referring to Figs. 1 and 2, it should have been stated that the face plate A' at the front of the machine covers substantially all of the mechanism but is cut away centrally so as to expose the space through which the column of uncounted bills ascends, as well as being cut away for the admission of the slide $e^6$ as already explained. The portion which is cut away in front of the column of bills permits the operator to insert bills. The box or chamber containing the bills consists of the table A for its bottom, two vertical walls J, J' at the sides of the column of bills, and a rear wall $J^2$, there being of course no walls at the top or front. On either side of the compartment is an auxiliary suction chamber, one marked $J^3$ and the other $J^4$, which are substantially similar. The suction chamber $J^3$ connects with the main suction chamber B by means of a passage $J^5$ extending through the front wall $B^2$ of the main suction chamber, and the other auxiliary suction chamber $J^4$ is similarly connected. The purpose of the two auxiliary suction chambers is to produce at their upper end adjacent to the side edges of the topmost bills, a flow of air whose tendency is to create a horizontal pull upon the upper two or three bills, thus tending to maintain them in their proper position until the topmost one is engaged and removed by the operation of the suction chambers already described. Instead of having the upper end of each auxiliary suction chamber open for the entire length of the bill, I have constructed it to be open at separated points, for example at four points as seen in Figs. 4 and 5. This is accomplished by a peculiar formation of the upper end of the auxiliary suction chamber, according to which there is presented to the edge of the bills alternately an air suction space followed by a space open to the atmosphere. The letter $j$, Fig. 4, shows one of the actual suction openings presented to the uppermost bills, and $j'$ represents one of the air spaces between the several suction openings. It will be understood that the continuous inward air flow is going on to a limited extent at four points on either side of the column of bills, and these eight points of air flow have a tendency already explained of creating a horizontal pull on the several uppermost bills. It is highly desirable, however, that a complete vacuum or a very high vacuum be avoided in the space between any two of the upper bills, which might result from the operation of the suction. To prevent this I have provided the alternate air spaces $j'$ as already explained. By this arrangement the air flow will be inward or toward the bills through the spaces $j'$ to a small extent, and outward through the suction openings $j$, creating a circulation and maintaining the bills sufficiently free from a high vacuum to prevent their accidental adherence while the topmost bill is being removed and transferred to the bunching, binding and stamping mechanism.

In order to assist in the operation of the above described devices, I have provided an auxiliary device in the nature of a series of bristles $k$ whose action is to insure the separation of the topmost bill from the next one beneath it. These bristles extend the whole length of the bill and are secured in place by a thin strip of metal or other material, $k'$, which in turn is secured in place by the rivet or screw $k^2$. Whenever the suction cylinders are operating to lift the topmost bill, these fine springy bristles $k$ immediately insert themselves beneath the edge of the topmost bill, thus engaging and holding down against accidental removal the next succeeding bill.

I will now describe the operation of the feed table C, see Figs. 1, 2 and 17 to 20. A sprocket chain $l$, Figs. 1 and 2, is driven by the same motor as that which drives the sprocket $g'$ already described. The chain $l$ passes around the sprocket wheel $l'$ and thus drives a central worm shaft $l^2$, upon which is a worm $l^3$ engaging a worm wheel $l^4$ which turns about a vertical axis. The vertical screw shaft C' already referred to and at the top of which is supported the feed table C, forms the center about which the worm wheel $l^4$ turns, and the worm wheel contains movable devices or jaws which are capable of engaging the threads of the screw shaft C'. Two such jaws are shown, and they are marked L and are shown in detail separately in Figs. 19 and 20. Each jaw has projections or teeth $l^5$ capable of engaging the threads in the screw shaft C'. It also has upper and lower slide portions $l^6$ and $l^7$ which engage with the upper and lower surfaces of the wheel $l^4$, the wheel being provided with a hole at $l^8$, in which the jaw slides radially inward and outward. Each jaw also has an upward projection $l^9$ with a horizontal extension $l^{10}$ for a purpose that will hereinafter appear. A spring $l^8$ is employed, it being located in the aperture $l^{8a}$ of the wheel $l^4$, this spring having a tendency to push the jaw L radially inward and maintain it in engagement with the vertical screw shaft C'. As the worm wheel $l^4$ has to bear the weight of the feed table and the bills thereon, said worm wheel is provided with ball bearings at $l^{4a}$ to insure its easy running. It will be understood that the feed table C does not rotate and neither does the screw shaft C' which supports it. Said screw shaft is of a peculiar construction, having very important results in the operation of the feed table. The outer diameter of the screw shaft, as determined by the outer points $c$ of the threads, is uniform from top to bottom, whereas the diameter of the inner core determined by the base $c'$ of the indentations between the threads is of conical form, tapering from its narrowest diameter at the top to its broadest diameter at the bottom. The thread, moreover, is of a peculiar form, and instead of being square, each thread is beveled or inclined at its upper side as indicated at $c^2$, Fig. 18. As seen in Fig. 19, the teeth $l^5$ of each jaw have a corresponding shape to that of the thread of the shaft C'.

When the worm wheel is turned with a right hand elevation as in Fig. 17, the jaws L acting as a nut, cause the screw shaft to gradually rise, lifting the feed table with it, thus compensating for the bills or objects which are removed from the feed table. It will be seen that as the table rises higher and higher, the tapered form of the screw core causes the jaws L to gradually move farther and farther apart until when the table has reached the extreme upper end of its movement the said jaws will practically disengage from the threads of the screw shaft. The purpose of the projections $l^{10}$ will now be made apparent. They move gradually farther apart as the table rises. When the table has reached its uppermost position, the parts $l^{10}$ are so far apart as to permit the disk $l^{11}$ to enter between them and hold them in their separated position, thus holding the jaws in their outward position disengaged from the threads of the shaft C'. A curved plate spring $l^{12}$ continually presses up on the disk $l^{11}$ and thus causes it to take its position between the projections $l^{10}$ as described. When the parts have reached this stage the screw shaft C' and feed table C drop to their original or lowest position. In falling the table C at its under side comes in contact with and operates four small rods $l^{13}$ shown dotted in Fig. 17 and best seen in Fig. 18. These rods at their lower ends connect with the disk $l^{11}$ already mentioned, and when depressed the rods cause the disk to descend. In this way the disk is released from between the projections $l^{10}$, and in turn said projections and the two jaws L are permitted to return to their original or inward position under the influence of the springs $l^8$, and the parts are in readiness for a new operation.

In case the operator should place upon the feed table C a quantity of bills insufficient to fill the entire vertical space above the table, he may after inserting the bills manually push the table upward until the topmost bill comes into proper position beneath the suction cylinder. This is permitted by the before-described form of screw threads of the shaft C', together with the presence of the springs $l^8$. Said springs permit the jaws to move outwardly and the action of raising the table C is one of wedging the jaws apart, owing to the inclined surfaces $c^2$ of the screw threads. Immediately the operator stops raising the table the jaws snap back into place and the machine is ready for operation.

A valuable auxiliary to a machine of the kind being described is a counter, and I have shown in Fig. 1 a counter M of any ordinary construction, it being of the kind which registers one number when its projecting lever $m$ is depressed. In order to cause the depression of lever $m$ at every operation of the machine, I have provided a bell crank lever having arms $m'$ and $m^2$, the long arm $m'$ of which lever is connected by the link $m^3$ with the lever $m$. A fixed projection M' mounted on the slide F moves to and fro with the slide, and at the left-hand of its movement strikes against the arm $m^2$ of the bell crank lever, thereby acting through the link $m^3$ to cause the depression of lever $m$ so as to register one number. In the form of machine that I have shown the bill is removed from the column not only with the left-hand movement of the slide F, but also with the right-hand movement, and it is, therefore, desirable that the counter shall operate also upon such right-hand movement. To this end I have provided a second bell crank lever with long arm $m^4$ and short arm $m^5$, the latter adapted to be struck by the projection M' at the extreme of its right-hand movement. This throws the bell crank lever $m^4$, $m^5$. The arm $m^4$ has at its end a lateral projection $m^6$ which bears on top of the arm $m'$ of the first-named bell crank lever. In this way the second bell crank lever causes the depression of the arm $m'$, and it in turn acting through the link $m^3$ depresses the lever $m$ and causes a single number to be registered on the counter.

I will now describe the portion of the machine which receives the successive bills as they are removed from the column of uncounted bills, and which bunches, binds and stamps them. This mechanism is best shown in Figs. 1, 10 and 11, and the diagrams in Figs. 8 and 9 illustrate, as previously explained, the manner in which each successive bill is introduced into the bill receiving jaws.

Referring to Fig. 10, N represents the central axle or shaft of the mechanism to be described, and it turns in bearings which may be for convenience arranged as follows. The front bearing will be the face plate A' of the machine, the axle N extending rearwardly therefrom toward the main suction chamber. Since, however, the axle N is of the same level as shown in Fig. 1, with the axes of the suction cylinders, the rear end of said axle must be so journaled as not to interfere with the horizontal to and fro movements of the slide F. To this end a special bearing plate N' is employed which extends upwardly and downwardly in front of the path of the slide F, and the plate N' is held away from the front side of the main suction chamber by blocks whose position is indicated by the dotted line $N^2$. It will be understood that a similar arrangement of axle N and separating parts are provided at the other end of the machine.

Upon axle N is mounted a sprocket wheel $N^3$ which as shown in Fig. 1, is engaged by a sprocket chain $N^4$ that passes downwardly, engaging a sprocket wheel on the auxiliary shaft $N^5$, said shaft having a second sprocket wheel which is engaged by the chain $N^6$ for driving it, the chain $N^6$ passing to the regulating or controlling mechanism shown at the lower left-hand corner of Fig. 1, which will be separately described hereinafter. It is sufficient at this time to state that this regulating mechanism normally does not actuate the axle N, but only when a predetermined number of bills have been transferred and deposited in the bunching, binding and stamping mechanism.

Three separate parts are keyed upon the shaft N so as to rotate with it. The first of these parts is a central bar O, it being midway between the other two parts, namely, two squared iron castings P, P', seen only in dotted lines in Figs. 10 and 11.

The squared iron castings P, P', are merely for the purpose of supporting the jaw frames, and as they are substantially alike, we will confine the description to the left-hand one, namely P, Fig. 11. The jaw frame which is mounted upon the casting P is of a four-arm arrangement and for convenience the four arms are produced by means of four pieces of sheet metal, one of which is marked $p$ in Fig. 10, this showing the construction and arrangement of all four of them. The result of this construction is the four radial arms $p'$, $p^2$, $p^3$, $p^4$; $p'$ and $p^3$ preferably being in alinement with, and at right angles to, the line of $p^2$ and $p^4$, although this is not essential.

In the space between the jaw arms $p^3$ and $p^4$ is certain mechanism which will now be described, and it is in this jaw space that the bills are intended to be received preparatory to their bunching, binding and stamping. In like manner the space between the arms $p'$ and $p^2$ is adapted to receive bills when the axle N has been rotated a half revolution. In other words, either one or the other of the two jaw spaces will be presented toward the pneumatic cylinders that deliver the bills, while the other will be at the diametrically opposite position.

Confining the description now to the left-hand jaw space in Fig. 10, which is the one on the side toward the pneumatic cylinder, the said space is partly inclosed by a pair of flexible jaws Q, Q, which are substantially alike, one at the upper side and mounted upon the extremity of the jaw arm $p^4$, the other at the lower side and mounted upon the extremity of the jaw arm $p^3$. It will be understood, as seen in Fig. 11, that these jaws Q are of narrow width and that in a single machine but four separate parts of them are employed surrounding each jaw space. As all are substantially the same, it is sufficient to describe a single one of the resilient jaws. In order to make each of the jaws Q resilient and give it capability of swinging outward, it is provided with a coil spring $q$, the tendency of which is to bring the jaw back when outwardly displaced, into its normal position as shown in Fig. 10.

Referring again to Fig. 10, the jaw space at the left, as has been explained, is partly inclosed above and below by the resilient jaws Q, Q. At its inside or rear the said jaw space is provided with a back plate R which is supported, and is held normally in the indicated position, by means of the coil spring $r$ which is of light tension, said coil spring at its inner end being attached as by soldering to one of the plates $p$. As seen in Fig. 11, there are four of these resilient back plates R, one corresponding to each of the pairs of jaws Q, Q.

We are now prepared to return to the diagrams Figs. 8 and 9 and better understand the operation of the mechanism shown therein. The pneumatic cylinder E when it has moved outwardly sufficiently to turn three-fourths of a revolution, has reached the position shown in Fig. 8, at which point the revolution stops and the bill $c$ instantaneously stands either in the position indicated in Fig. 8 or else somewhat wrapped around the exterior of the pneumatic cylinder. It will be understood that the cylinder does not stop its outward movement when the revolution stops, but on the contrary continues moving outward until it reaches the position shown in Fig. 9. This movement from the position of Fig. 8 to that of Fig. 9 is a sort of thrust and serves to shove the bill $c$ into the jaw space and close between the jaws Q, Q and the back plate R. All of the springs being of light tension the bill is lightly held in this position, and there being no suction operating at this point, the suction cylinder is enabled to withdraw from the position of Fig. 9 to that of Fig. 8 and continue inward without disturbing the position of the bill that has just been deposited in the jaw space. This operation of depositing or thrusting successive bills into the jaw space is continued, the bunch of bills therein increasing in thickness as shown at $c^7$, Fig. 10, until finally when the desired number, for example one hundred bills, have been deposited in the jaw space, the regulating mechanism hereinafter to be described will effect a half rotation of axle N, thus interchanging the position of the two jaw spaces and performing certain other functions which will be explained.

The distance between the extremities of a pair of jaws Q, Q, is made somewhat less than the outer diameter of the suction cylinder so that, as is clear from Figs. 8 and 9, said jaws Q, Q, will come in contact with the circumference of the cylinder during the outward movement of the latter, and the cylinder will to some extent force the jaws apart, the resilience of the latter permitting such action. The result of this action will be first that if the bill stands vertically as seen in Fig. 8, it will be pressed by the extremities of the jaws Q, Q, until it partially wraps itself around the circumference of the cylinder. As the cylinder continues its outward movement, the jaws will be slightly spread apart and will pass farther around the circumference of the cylinder, as seen in Fig. 9. Indeed, the parts are so made that the jaws will pass sufficiently around the circumference of the cylinder as to pass by the side edges of the bill and thereby the bill is brought wholly within the jaw space. Were the bill not brought wholly within the jaw space, it would not maintain its position, but as seen in Fig. 10, the outermost of the bills $c^7$ is held in a concave position with three bearing points, and the light tension springs serve to hold the same sufficiently secure for the purpose of the machine.

I will now describe the mechanism which serves to bind the predetermined number of bills into a bundle and place a wrapper around them, which wrapper is stamped with suitable numerals and figures indicating the size of the bills, the quantity thereof, total value, date, or other convenient data.

The mechanism which feeds, cuts off, glues and wraps the binder will first be described. This mechanism is driven from a vertical shaft S, Figs. 1 and 2, whose lower end is connected with the regulating mechanism, as will be described in connection with the description of the regulating mechanism. The vertical shaft S is for the left-hand end of the machine and a similar shaft S' is provided at the right-hand end, the two shafts being connected together by sprocket wheels $S^2$ and a chain $S^3$, so that the two vertical shafts rotate in unison. They will be driven with practical continuity so that the band feeding mechanism operates continuously.

At the upper end of the vertical shaft S (or S') is a bevel gear wheel $S^4$ engaging a similar wheel $S^5$ upon a horizontal shaft $S^6$, and secured on the latter shaft is the main feed roll $s$, shown in dotted lines Figs. 1 and 2, which serves to feed the strip of paper from a large supply reel $S^7$, which reel is pivoted at $s^7$ upon a fixed bracket $s^8$.

$s'$ represents the strip of paper which is being fed from the supply reel. It passes between the main feed roll $s$ already referred to and an idler roll $s^2$, which maintains pressure upon the strip. The idler roll $s^2$ is upon a pair of swinging arms $s^3$ pivoted at their lower ends so that the rolls $s$ and $s^2$ can be separated when desired and when in contact the roll $s^2$ is held in place by gravity. The strip of paper after passing downward between the rolls $s$, $s^2$, passes through a guide, then through a pair of scissors, and then downward, as shown at $s'$, Fig. 10, passing immediately behind the bunch of bills in the receiving jaws to a point at $s^4$ considerably below the jaw space.

It has been stated that the feed roll $s$ is continuously driven and, therefore, the strip $s'$ of paper is continuously passing downward. The point $s^4$ merely represents its extreme downward position, which will be at a stage when the full number of bills have been received in the receiving jaws and the regulating mechanism is about to rotate the axle N. When this occurs several things happen. In the first place the scissors, which will be described, snip off a portion of the paper strip considerably above the receiving jaws and the said severed portion is then quickly wrapped around the bunch of bills, one of the ends of the severed paper strip having glue applied to it during the operation so that the band becomes glued and permanently fastened around the bundle of bills, following which the rotation of axle N carries said bundle beneath the printing roll, the receiving jaws finally taking a position diametrically opposite original position.

The scissors referred to are best shown in Figs. 15 and 16. We have already referred to the vertical plate N' which contains the bearing to shaft N. As seen in Fig. 16, the top of said plate N' has rigidly secured to it a bracket T' extending horizontally and inclined upward, and at the outer end of this bracket is located the scissors T consisting of the lower and upper scissor portions $t$, $t'$. The location of this with respect to the other parts of the machine is seen in Fig. 1. The underneath scissor part $t$ is stationary, while the upper portion $t'$ swings horizontally about the pivot $t^2$ and extends at its rear end to where at $t^3$ it is provided with a slot engaging with a pin $t^4$ mounted upon an arm $t^5$ which is pivoted to a vertical shaft $t^6$. This shaft is seen in Fig. 1 and Fig. 16, it passing downwardly from the scissors through a bearing formed in a lug $t^7$. At its lower end the vertical shaft $t^6$ is provided with a second arm $t^8$, the extremity of which has a downward projection $t^9$ for coöperation with a cam $t^{10}$, formed near the circumference of a wheel $t^{11}$ fast on the axle N. It should be explained that for convenience the vertical dimensions have been shortened in Fig. 16 so as to reduce the height, and especially the lug $t^7$ is of very much less vertical dimension than as shown in Fig. 1.

As soon as the axle N commences to rotate after a hundred or other predetermined number of bills have been deposited in the receiving jaw, then the cam $t^{10}$ rotating with said axle engages against the projection $t^9$, thus swinging the arm $t^8$, rotating the vertical shaft $t^6$, swinging the arm $t^5$ at its upper end, thereby swinging the upper scissor part $t'$ and closing the scissors. This snips off the strip of paper at a point sufficiently high to leave the strip of proper length to be wrapped and fastened around the bundle of bills. Immediately the scissors thus operate they again open and the paper passes on down between them for the next operation. In order to properly guide the paper and keep it between the scissor parts, I have shown a guide $T^2$ in Fig. 16, secured immediately above the scissors and centrally slotted from the point $t^{12}$ to its outer extremity, the strip of paper $s'$ passing through said slot and between the scissor parts.

As the axle N starts to rotate not only do the scissors snip off the paper as explained, but the parts come into action which wrap the severed strip of paper around the bunch of bills. One of these parts is the fly U, which is pivoted at $u$ on the outer end of the bar O, said fly having a spring $u'$ tending to rotate it in the direction of the hands of a watch, the spring acting through a wire or flexible connection $u^2$ which is partly wound around the pivoted end of the fly as seen in Fig. 10. To accommodate the spring $u'$ and in fact both of them for one is provided at each end, the bar O is centrally cut away, as seen in Fig. 11.

Normally the fly U is held in the position shown in Figs. 10 and 11 by a finger U'. A very slight rotation of axle N releases the fly U from the finger U', permitting the spring $u'$ to come into action, which snaps the fly around from the normal position until it reaches a position in front of the bunch $c^7$ of bills. During this motion of the fly it encounters the lower portion $s^4$ of the paper strip $s'$ and carries it around from the vertical position shown in Fig. 10 to a position directly in front of the bunch $c^7$ of bills.

The upper extremity of the paper strip is likewise wrapped around the upper edge of the bunch $c^7$ of bills, and this is accomplished by said paper strip coming in contact with the corner $u^3$ of a guide $U^3$, which guide is rigidly secured upon a bracket $U^4$, which in turn is secured to the frame part of the machine, as shown in Fig. 2. As the axle N rotates to the right its tendency is to carry the paper strip with it, but said strip strikes the corner $u^3$ and is thereby bent sharply around to the left and as the rotation of axle N continues the strip is carried far enough around to cause it to come in contact with the other end $s^4$ of the strip, which has been previously bent up by the fly U, as explained.

It will be noticed in Fig. 10 that the bunch of bills has assumed a curved form which enables the paper strip to be secured around it in a somewhat loose condition so that when the bunch is afterward straightened the paper will become taut as it should be. In order to cause the two ends of the paper to be glued together, I have arranged a glue roll in such location that the upper end of the severed paper strip will come in contact with the roll when the axle N rotates.

Referring to Fig. 1, $U^5$ represents a glue vessel having a hinged cover $u^5$. A glue roll $U^6$ is pivoted to rotate at one side of the glue vessel in such way that the surface of the roll will pass first into the glue vessel and then outward therefrom when rotated. The glue roll $U^6$ is kept in continual rotation by means of a pulley $u^6$ connected by a belt $u^7$ to a larger pulley $u^8$ mounted upon the main feed shaft $S^6$. The glue roll is so located that the upper end of the paper strip when deflected by the corner $u^3$ of the guide $U^3$ will come in contact with the glue roll and receive a sufficient amount of glue to enable it to adhere to the other end of the paper strip. As the axle N rotates the fly U passes within the guide $U^3$, its position during this rotation being substantially as shown at U at the upper end of the bar O, Fig. 10. During this half revolution the bunch of bills with the paper strip wrapped and glued around it is carried beneath the guide $U^3$ from the position $c^7$ Fig. 10, to a diametrically opposite position, and in the course of this half revolution the paper strip binding the bunch of bills passes directly beneath the printing roller $U^7$ and receives an impression therefrom of whatever matter may be placed upon the roll. Springs $U^9$ press the roll downwardly with a light tension so as to insure contact with the paper strip.

It will be understood that the jaw space at the right-hand side of Fig. 10 will revolve around a half revolution to a position opposite the pneumatic cylinders for the purpose of receiving a new bunch of bills. During this revolution the fly U which coöperates with said jaw space, is acted upon by the point $u^{10}$ of the before-mentioned finger U', thus causing the fly to be pressed backward and assume its proper original position. The point $u^{10}$ of the finger U' will also become inserted behind the bunch of bills in the jaw space at the right, and cause the same to be thrown outwardly onto the operator's table or a receptacle placed there for the purpose.

The purpose of the regulating mechanism about to be explained is to cause the axle N to come into operation at the end of a given number of actions of the pneumatic cylinders. For example, at the end of two hundred single reciprocations of the cylinders, the axle N may be brought into rotation to cause the binding and stamping of a bundle of one hundred bills on either side of the machine.

Figs. 1, 2, 12, 12$^a$, 13 and 14 show the regulating mechanism. The principal member of this mechanism is a ratchet wheel V having teeth closely spaced, and provided with one or more pawls. I have shown three pawls, $v'$, $v^2$, $v^3$, which are differently spaced with respect to the length of the teeth so that extreme minuteness may be obtained in the operation of the pawls. These three pawls are mounted directly upon an arm $v$, and the arm $v$ is loosely mounted on the axle V', while the ratchet V is keyed to a short sleeve $V^3$ shown in dotted lines in Fig. 13. There is a second sleeve $V^2$ which rotates loosely on axle V', but is independent of the sleeve $V^3$. The interior axle V' passes through the face plate A' of the machine and is suitably pivoted at the rear in the front wall $B^2$ of the suction chamber.

The arm $v$ with its pawls is actuated by the following means: The fixed slide $v^4$ has sliding within it a piece $v^5$, this sliding piece having a pin $v^6$ which engages a slot formed at $v^7$ in the arm $v$. The right-hand end of the slide $v^5$, as seen in dotted lines in Fig. 1, has a toe $v^8$ which engages with the toe $f$ of the extension F' of the reciprocating slide F, said toe being better shown in Fig. 7. The reciprocation of the slide F causes a right reciprocation of the toe $f$ and this in turn causes the reciprocation of the slide $v^5$, although the reciprocation of said slide can be regulated in extent by means of a stop arm $v^9$. A spring $v^{10}$, Fig. 1, is constantly pulling toward the right upon the arm $v$ so as to give to said arm a return movement when the same has been moved toward the left by the toe $f$. The extent of this return movement is regulated by the position of the stop arm $v^9$. Manifestly the adjustment of said stop arm in different positions will limit the extent of return movement of arm $v$, and consequently the extent of its oscillation. Moreover the greater the oscillation of arm $v$, the greater will be the movement of ratchet V at each reciprocation of the slide F. In this way the operator can control a number of reciprocations of slide F that must occur before the ratchet wheel has made a complete revolution. In turn this control gives him the power of controlling the number of bills which must be comprised in each bundle. To facilitate this regulation an exterior regulating arm or pointer $v^{11}$ is employed, it being located in front of the face plate A' and secured at the forward end of the shaft V'. The stop arm $v^9$, as seen in Fig. 13, is secured at the rear end of the shaft V' so that the movement of the pointer $v^{11}$ controls the position of the stop arm. A proper scale $v^{12a}$ laid out on the face plate is a convenient means of enabling the operator to at will adjust the machine for making bundles of any desired number of bills. At the end of a complete revolution of the ratchet V the mechanism is caused to produce in the shaft N a half revolution.

Referring to Fig. 13, $v^{12}$ represents a disk shaped cam secured to one side of the ratchet V, and $v^{13}$ represents a similar but oppositely arranged cam opposed thereto, and a sufficient distance therefrom to accommodate a coil spring $v^{14}$. On the outside face of the disk cam $v^{13}$ is a gear wheel $v^{15}$, and this and the cam $v^{13}$ are secured fast upon the sleeve $V^2$. The inner end of spring $v^{14}$ is secured to the cam $v^{12}$, which turns with the ratchet, while the outer end of said spring is secured to the cam $v^{13}$. As the ratchet is gradually rotated, it serves to wind up the spring $v^{14}$ producing a tension therein, the tendency of which is to revolve the cam $v^{13}$ in the same direction. The cam $v^{13}$, however, is normally kept from rotating by means of a pivoted latch $v^{17}$ located at the end of an arm $v^{18}$ pivoted at $v^{19}$. The shape of the cam $v^{13}$ is clearly shown in Fig. 12$^a$ and the cam $v^{12}$ partly shown in dotted lines will be seen to be of the same shape but faced in the opposite direction. The latch $v^{17}$, as seen in said figure, comes between the stop surfaces of the cams $v^{12}$, $v^{13}$, and for this purpose the latch is broadened above the point where it is pivoted as shown by the curved line $v^{20}$, its end $v^{17}$ thereby having sufficient breadth to engage in the stop surfaces of both said cams. As seen in Fig. 12, as spring $v^{21}$ is employed, it constantly tends to push the latch inward. As the ratchet V slowly rotates, the cam $v^{12}$ rotates with it, and owing to the eccentric shape of its outer edge, said cam little by little pushes outward upon the latch $v^{17}$, causing it to move to the left in Figs. 12 and 12$^a$. But the proportions of the parts are so calculated that at the end of a complete revolution of the ratchet V, the latch $v^{17}$ will have reached its extreme or left-hand position, and in this position it releases the cam $v^{13}$, permitting said cam to revolve under the action of the spring $v^{14}$ so that said cam makes a complete revolution until it is stopped by coming in contact with the latch $v^{17}$, and the latch $v^{17}$ at the same time having moved back to its position of Fig. 12$^a$. It will be understood that the revolution of $v^{13}$ is a lefthand revolution viewed from Fig. 12$^a$.

Of course when the cam $v^{13}$ makes a complete revolution as above described, the sleeve $V^2$ revolves with it. At the left end of sleeve $V^2$, Fig. 13, is a sprocket W which is connected to one of the axles N for causing it to make a half revolution.

$w$ represents a sprocket chain engaging sprocket W and passing upwardly around the sprocket wheel $N^3$, already referred to.

In order to drive the axle N at the other or right-hand end of the machine, I have provided an auxiliary shaft $w^2$ mounted on an independent bracket $w^3$, Figs. 12 and 13, and on the auxiliary shaft $w^2$ is a gear $w^4$ which engages with the gear $v^{15}$. The gear $w^4$ therefore turns with the sleeve $V^2$ whenever the latter is actuated. Fast also upon the shaft $w^2$ is a sprocket wheel $w'$, and this sprocket wheel connects by the sprocket chain $N^6$ already mentioned, its motion being conveyed through another auxiliary shaft $n^5$ and a third sprocket chain $N^4$ so as to drive the axle N at the right-hand end of the machine.

The rotation of vertical shaft S can now be explained. Near its foot it is provided with a gear X having teeth at forty-five degrees, like a screw, and this gear X engages with a similar gear X', shown dotted in Fig. 2, said gear X' being on a short shaft at the other end of which is an ordinary gear $X^3$, Figs. 2 and 12, which gear $X^3$ engages with a similar gear $X^4$ directly behind it in Fig. 2 and shown in Fig. 12 as mounted on the same sleeve $V^3$ that carries the ratchet V. In this way the glue roll and the paper feed roll s are made to rotate continuously as long as the ratchet is rotated.

What I claim as new and desire to secure by Letters Patent is:

1. In a machine of the kind described, the combination of a support for a column of uncounted bills or like objects, means for receiving and gathering objects removed from said column, mechanism including a vibratory suction device, for successively removing objects from said column and transferring them directly to said receiving means, and a regulating mechanism acting at predetermined intervals for segregating the objects gathered in said receiving means.

2. In a machine of the kind described, the combination of a support for a column of uncounted bills or like objects, said support having mechanism for feeding it upward to compensate for the objects removed from the column thereon, means for receiving and gathering objects removed from said column, mechanism including a vibratory suction device, for successively removing objects from said column and transferring them directly to said receiving means, and a regulating mechanism acting at predetermined intervals for segregating the objects gathered in said receiving means.

3. In a machine of the kind described, the combination of a support for a column of uncounted bills or like objects, means for receiving and gathering objects removed from said column, mechanism including a vibratory suction cylinder, for successively removing objects from said column and transferring them directly to said receiving means, mechanism for rotating said suction cylinder, and a regulating mechanism acting at predetermined intervals for segregating the objects gathered in said receiving means.

4. In a machine of the kind described, the combination of a support for a column of uncounted bills or like objects, means for receiving and gathering objects removed from said column, mechanism including a vibratory suction cylinder, for successively removing objects from said column and transferring them directly to said receiving means, mechanism for shifting and rotating said suction cylinder to give it a rolling motion, and a regulating mechanism acting at predetermined intervals for segregating the objects gathered in said receiving means.

5. In a machine of the kind described, the combination of a support for a column of uncounted bills or like objects, means for receiving and gathering objects removed from said column, mechanism including a vibratory suction device, for successively removing objects from said column, and transferring them directly to said receiving means, and a regulating mechanism acting at predetermined intervals for segregating the objects gathered in said receiving means, said regulating mechanism including a ratchet and pawl operated from the said removing and transferring apparatus.

6. In a machine of the kind described, the combination of a support for a column of uncounted bills or like objects, means for receiving and gathering objects removed from said column, said receiving and gathering means having a plurality of receiving portions and being revoluble for moving each receiving portion from receiving position to idle position, while the other portion moves to receiving position, mechanism including a suction device, for successively removing objects from said column and transferring them to said receiving means, and a regulating mechanism acting at predetermined intervals for revolving said receiving means, and so segregating the objects gathered therein.

7. In a machine of the kind described, the combination of a support for a column of uncounted bills or like objects, means for receiving and gathering objects removed from said column, said receiving and gathering means having a plurality of receiving portions and being revoluble for moving each receiving portion from receiving position to idle position, while the other portion moves to receiving position, mechanism including a suction device, for successively removing objects from said column and transferring them to said receiving means, and a regulating mechanism acting at predetermined intervals for revolving said receiving means, and so segregating the objects gathered therein; together with a mechanism for wrapping and fastening a strip of paper around the bills in said receiving means at the time the latter revolves.

8. In a machine of the kind described, the combination of a support for a column of uncounted bills or like objects, means for receiving and gathering objects removed from said column, said receiving and gathering means having a plurality of receiving portions and being revoluble for moving each receiving portion from receiving position to idle position, while the other portion moves to receiving position, mechanism including a suction device, for successively removing objects from said column and transferring them to said receiving means, and a regulating mechanism acting at predetermined intervals for revolving said receiving means, and so segregating the objects gathered therein; together with a mechanism for wrapping and fastening a strip of paper around the bills in said receiving device at the time the latter revolves, and a printing roll for impressing printed matter on said paper strip during the revolution of said receiving means.

9. In a machine of the kind described, the combination of a support for a column of uncounted bills or like objects, two separate receiving and bunching devices arranged with the said column between them, a mechanism comprising a pneumatic device shiftable to and fro between said receiving and bunching devices, for successively removing the bills from the top of said column and transferring them alternately to one and the other of said receiving and bunching devices.

10. In a machine of the kind described, the combination of a support for a column of uncounted bills or like objects, two separate receiving and bunching devices arranged with the said column between them, a mechanism comprising a pair of rotating pneumatic cylinders shiftable to and fro between said receiving and bunching devices, for successively removing the bills from the top of said column and transferring them alternately to one and the other of said receiving and bunching devices, one cylinder coöperating with each of said receiving devices.

11. In a machine of the kind described, the combination of a support for a column of uncounted bills or like objects, vibratory mechanism for successively taking the bills from the top of said column and transferring them directly to the receiving device, and mechanism including receiving means for receiving and bunching said bills together with band wrapping devices and a regulator which brings about the operation of the receiving means and the band wrapping devices at predetermined intervals.

12. In a machine of the kind described, the combination of a support for a column of uncounted bills or like objects, mechanism for successively taking the bills from the top of said column and transferring them to the receiving means in substantially upright position, and mechanism including receiving means for receiving and bunching said bills together with band wrapping devices and a regulator which brings about the operation of the receiving means and band wrapping devices at predetermined intervals, said receiving means comprising a pair of jaws inclosing a receiving jaw-space adapted to receive bills in substantially upright position and hold them there.

13. In a machine of the kind described, the combination of a support for a column of uncounted bills or like objects, mechanism for successively taking the bills from the top of said column and transferring them to the receiving means in substantially upright position, and mechanism including receiving means for receiving and bunching said bills together with band wrapping devices and a regulator which brings about the operation of the receiving means and band wrapping devices at predetermined intervals, said receiving means comprising a pair of jaws inclosing a receiving jaw-space adapted to receive bills in substantially upright position and hold them there in curved condition, substantially as described.

14. In a machine of the kind described, the combination of a support for a column of uncounted bills or like objects, mechanism including a suction cylinder for successively taking the bills from the top of said column and transferring them to the receiving means, said cylinder moving laterally without rotation during the deposit of the object in the receiving means, and mechanism including receiving means for receiving directly from said suction cylinder and there bunching said bills together, and a regulator which brings about the operation of the receiving means at predetermined intervals.

15. In a machine of the kind described, the combination of a support for a column of uncounted bills or like objects, mechanism for successively taking the bills from the top of said column and transferring them to receiving means, and mechanism including a plurality of receiving means for receiving and bunching said bills, said receiving means disposed around an axle which is rotatable for bringing one receiving means into active position while another passes from active to idle position, and a regulator which brings about the rotation of said axle at predetermined intervals.

16. In a machine of the kind described, the combination of a support for a column of uncounted bills or like objects, mechanism for successively taking the bills from the top of said column and transferring them to receiving means, and mechanism including a plurality of receiving means for receiving and bunching said bills, said receiving means disposed around an axle which is rotatable for bringing one receiving means into active position while another passes from active to idle position, paper strip feeding and severing devices, means for automatically wrapping a severed paper strip around said bunch upon each operation of said axle, and a regulator which brings about the rotation of said axle at predetermined intervals.

17. In a machine of the kind described, the combination of a support for a column of uncounted bills or like objects, mechanism for successively taking the bills from the top of said column and transferring them to receiving means, and mechanism including a plurality of receiving means for receiving and bunching said bills, said receiving means disposed around an axle which is rotatable for bringing one receiving means into active position while another passes from active to idle position, paper strip feeding and severing devices, means for automatically wrapping a severed paper strip around said bunch upon each operation of said axle, means for applying glue to cause adherence of said strip, and a regulator which brings about the rotation of said axle at predetermined intervals.

18. In a machine of the kind described, the combination of a support for a column of uncounted bills or like objects, mechanism for successively taking the bills from the top of said column and transferring them to receiving means, and mechanism including a plurality of receiving means for receiving and bunching said bills, said receiving means disposed around an axle which is rotatable for bringing one receiving means into active position while another passes from active to idle position, paper strip feeding and severing devices, means for automatically wrapping a severed paper strip around said bunch upon each operation of said axle, a printing wheel for impressing printed matter on said strip during the rotation of said axle, and a regulator which brings about the rotation of said axle at predetermined intervals.

19. In a machine of the kind described the combination of a support for a column of uncounted bills or like objects, mechanism for successively taking the bills from the top of said column and transferring them to receiving means, said mechanism including a plurality of receiving means for receiving and bunching said bills, said receiving means disposed around an axle which is rotatable for bringing one receiving means into active position while another passes from active to idle position, paper strip feeding and severing devices, means including a spring actuated fly controlled by a stop finger for automatically wrapping a severed paper strip around said bunch upon each operation of said axle, and a regulator which brings about the rotation of said axle at predetermined intervals.

20. In a machine of the kind described, the combination of a support for a column of uncounted bills or like objects, means for successively removing the uncounted objects from said column, and transferring them to receiving means, a regulator for controlling the deposit of objects in such receiving means, and mechanism coöperating with said support for feeding it upward to compensate for the removed objects, said support feeding mechanism comprising a pair of threaded or toothed spring pressed jaws which may be opened to restore the support to original position, and a screw shaft with threads inclined on one side, whereby the support may be manually adjusted to the initial height of the column of uncounted objects.

21. In a machine of the kind described, the combination of a support for a column of uncounted bills or like objects, means for successively removing the uncounted objects from said column, and transferring them to receiving means, a regulator for controlling the deposit of objects in such receiving means, and mechanism coöperating with said support for feeding it upward to compensate for the removed objects, said support feeding mechanism comprising a pair of threaded or toothed spring pressed jaws which may be opened to restore the support to original position, a screw shaft with tapered inner core to cause said jaws to open, and a part as disk $l^{11}$ to hold said jaws when fully open, whereby the support when fully raised will drop to initial position.

22. In a machine of the kind described, the combination of a support for a column of uncounted bills or like objects, means for successively removing the uncounted objects from said column and transferring them to receiving means, a regulator for controlling the deposit of objects in such receiving means, and mechanism coöperating with said support for feeding it upward to compensate for the removed objects, said support feeding mechanism comprising a pair of threaded or toothed spring pressed jaws which may be opened to restore the support to original position, a screw shaft with tapered inner core to cause said jaws to open, and a part as disk $l^{11}$ to hold said jaws when fully open, whereby the support when fully raised will drop to initial position, and means whereby the falling support actuates the disk and releases the jaws.

23. In a machine of the kind described, the combination of a support for a column of uncounted bills or like objects, mechanism for successively removing objects therefrom to where the same are received or gathered, and a regulating mechanism acting at predetermined intervals for regulating the number of bills or size of bunches, said regulating mechanism having an actuating wheel, such as ratchet V, an eccentric peripheral cam, as $v^{12}$ rotated by said ratchet, a second such cam, as $v^{13}$, having connection with the bill bunching mechanism, a coil spring between $v^{12}$ and $v^{13}$, one end connected to each, and a latch, as $v^{17}$, forced outward as $v^{12}$ rotates and serving to release $v^{13}$ at the end of a rotation, whereby at the end of each rotation of ratchet V the bunching mechanism is operated.

24. In a machine of the kind described, the combination of a support for a column of uncounted bills or like objects, mechanism for successively removing objects therefrom to where the same are received or gathered, and a regulating mechanism acting at predetermined intervals for regulating the number of bills or size of bunches, said regulating mechanism having an actuating wheel, such as ratchet V, an eccentric peripheral cam, as $v^{12}$ rotated by said ratchet, a second such cam, as $v^{13}$, having connection with the bill bunching mechanism, a coil spring between $v^{12}$ and $v^{13}$, one end connected to each, and a latch, as $v^{17}$, forced outward as $v^{12}$ rotates and serving to release $v^{13}$ at the end of a rotation, whereby at the end of each rotation of ratchet V the bunching mechanism is operated; and one or more pawls actuated from the mechanism which removes the bills from said column.

25. In a machine of the kind described, the combination of an adjustable support for a column of uncounted bills or other objects, mechanism including suction devices for removing objects one by one from the top thereof, a counting or regulating mechanism operated by said removing mechanism, and a suction apparatus for maintaining in place the uncounted bills beneath the top one, consisting of suction chambers on either side of said column, each of said suction chambers having a series of suction openings presented to the edges of the bills, and the walls being so formed as to present air spaces to the edges of the bills alternating with said suction openings, whereby an air flow between the bills will be created from said air spaces to suction openings.

26. In a machine of the kind described, the combination of an adjustable support for a column of uncounted bills or other objects, mechanism including suction devices for removing objects one by one from the top thereof, a counting or regulating mechanism operated by said removing mechanism, and a suction apparatus for maintaining in place the uncounted bills beneath the top one, consisting of suction chambers one either side of said column, each of said suction chambers having a series of suction openings presented to the edges of the bills, and the walls being so formed as to present air spaces to the edges of the bills alternating with said suction openings, whereby an air flow between the bills will be created from said air spaces to suction openings; and two rows of light bristles for mechanically holding the second bill from top.

In witness whereof I have hereunto set my hand, this 10th day of August, 1909.

ARTHUR von BARTH.

Witnesses:
C. C. BURDINE,
CONRAD A. DIETERICH.